United States Patent

Mitsch

[15] 3,674,785
[45] July 4, 1972

[54] CERTAIN FLUORIMINO OR AZOMETHINE CONTAINING COMPOUNDS

[72] Inventor: Ronald A. Mitsch, Falcon Heights, Minn.

[73] Assignee: Minnesota Mining and Manufacturing Company, Saint Paul, Minn.

[22] Filed: Jan. 9, 1964

[21] Appl. No.: 336,839

[52] U.S. Cl. ...................260/243 R, 149/109, 260/241, 260/244 R, 260/290 H, 260/290 HL, 260/313.1, 260/566 R, 260/566 D, 260/583 NH
[51] Int. Cl.................C07d 93/10, C07d 87/00, C07d 29/14
[58] Field of Search...................260/241, 583, 243 R, 244 R, 260/290 H, 290 HL, 313.1, 566 R, 566 D

[56] References Cited

UNITED STATES PATENTS

| | | | |
|---|---|---|---|
| 3,337,605 | 8/1967 | Sausen | 260/465.5 |
| 3,515,603 | 6/1970 | Brown et al | 149/109 |

*Primary Examiner*—Leland A. Sebastian
*Attorney*—Frank A. Steldt, Donald C. Gipple and Temple Clayton

EXEMPLARY CLAIM

8. A compound of the formula:

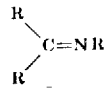

wherein each R is selected from the class consisting of fluorine and fluoroalkyl radicals and wherein R groups taken together can form ring systems, which compound comprises a ring which contains a plurality of hetero atoms therein, said ring containing only a single azomethine group, provided that said compound contains no atoms other than carbon, fluorine, nitrogen, oxygen and sulfur atoms.

10. Perfluoro-5,6-dihydro-2H-1,4-oxazine.

12. 1,1,1,1-tetrafluoroperfluoro-5,6-dihydro-2H-1,4-thiazine.

12 Claims, No Drawings

CERTAIN FLUORIMINO OR AZOMETHINE CONTAINING COMPOUNDS

This invention relates to a process for the production of certain fluorinated compounds and more particularly to a process of reductive defluorination to form fluorimino- or azomethine-containing compounds.

It is an object of the present invention to provide a process for the preparation of a broad class of useful chemical intermediates. It is another object of the invention to provide a process for the preparation of fluorinated oxidants. It is still another object of the invention to provide certain novel and useful heterocyclic compounds. Other objects of the invention will become apparent to those skilled in the art from reading the following specification.

The process of the invention can be represented as follows:

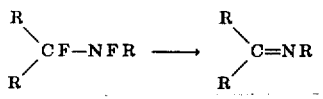

wherein the R groups are fluoralkyl or fluorine. The R groups can also combine to form rings (which rings can have other rings bonded or fused thereto). Ordinarily only two of the R groups in a single compound will form a ring system, but in some cases all three R groups will combine to form a fused ring system.

Included in the term fluoralkyl are perfluoro acyclic, branched and straight chain perfluoroalkyl radicals as well as perfluoroalkyl radicals containing perfluoro carbocyclic and heterocyclic rings including those containing oxygen, sulfur and nitrogen (e.g. perfluoropyridyl, perfluorocyclohexyl, perfluorofuranyl and perfluorocyclohexylethyl) etc. Likewise such perfluoro groups can be substituted by electro-negative groups which may replace one or more fluorine atoms. Such electronegative groups are characterized by having Hammett meta sigma parameters equal to or greater than + 0.3 (H. H. Jaffe, Chem. Reviews, Vol. 53, pp 191–261 (1953)). Such groups include oxidizing groups such as $-NF_2$, $=NF$, Cl, Br and the like groups. The R groups of the starting compounds of the reaction can also contain groupings of the type

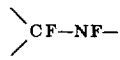

in which case the products thereof contain a plurality of

groups. Fluoroalkyl radicals thus substituted are included within the scope of R as above defined. Preferably, each R contains not more than 18 carbon atoms and if the Rs combine to form a ring system, they preferably contain not more than 18 carbon atoms between them. Further, rings formed of the two R groups on the carbon atoms (which consequently include the carbon atom) most preferably certain from three to seven atoms and those formed by one R group on the carbon atom and the R group on the nitrogen atom (which consequently include both the carbon atom and the nitrogen atom) most preferably contain from five to seven atoms. In both of these cases, however, such rings can carry additional substituents bonded or fused thereto.

The process of the invention is carried out in the presence of a reducing agent which is conveniently mixed with a solvent in which it has at least moderate solubility and which is inert with respect to the reactants and the products of the reaction at the temperature employed. The fluorinated starting material is then brought into contact with this solution and the reaction is spontaneously initiated. The products of the reaction are generally liquids under the conditions of the reaction and are recovered by conventional techniques, e.g. by distillation and condensation in one or more suitably cooled traps and/or by preparative vapor phase chromatographic techniques. The reduction step is generally accompanied by mild exotherm and proceeds smoothly to completion, quantitative or near quantitative yields being obtained in many cases. The length of time required for the reaction varies widely, depending upon the fluorocarbon reactant and particular conditions selected.

Moderate strength reducing agents are generally preferred to the stronger reducing agents since the reaction is more easily controlled when they are used. The preferred reducing agents are sandwich bonded organo-metallic reducing agents and derivatives thereof, other organo-metallic reducing agents and inorganic reducing agents which have reducing capacities equal to or greater than that of iodide. Among the particularly useful reducing agents are dicyclopentadienylmanganese (II), dicyclopentadienylruthenium (II), dicyclopentadienylnickel (II), dicyclopentadienyltitanium (II) and dicyclopentadienyliron (II) as well as substituted derivatives thereof, dicumenechromiun (II), dibenzenechromium (II), potassium iodide, potassium bromide, diphenyl amine, hydroquinone, etc.

The solvent which is chosen for any particular reaction according to the invention will depend upon the reactants and the conditions to be used, that is, upon the ability of the solvent to dissolve at least a moderate amount of the reducing agent and upon its inertness with respect to the materials present at any stage of the reaction. Ordinarily when potassium iodide is utilized as the reducing agent, aqueous acetonitrile is the preferred solvent. When a sandwich-type reducing agent is utilized, solvents such as xylene hexafluoride, benzotrifluoride, acetonitrile, benzene, carbon tetrachloride, fluorotrichloromethane, difluorodichloromethane, low polymers (oils) of trifluorochloroethene, tetrahydrofuran, dioxymethane and the like can be utilized.

The process is preferably carried out in the range of from about 0° to 50° C. Although some reaction occurs in many cases below this temperature range, it is unnecessarily slow and there are no compensating advantages to such lower reaction temperatures. At temperatures above this range, on the other hand, the rate of the reaction is often excessive and there is a possibility of the degradation of either the fluorinated reactant or the product. Since both the reactants and the products are fluorine oxidizing agents which may react violently and even explosively, they should be handled with care.

The fluorinated starting materials can generally be obtained by electrofluorination of the desired hydrocarbon amines. They are ordinarily liquids at ambient temperatures and are handled with suitable techniques to avoid the use of unnecessarily high pressures. They include perfluoroethylamine, perfluorododecylamine, perfluoro-di-n-dodecylamine, perfluoro-2-ethyloctadecylamine, perfluorocyclopentylamine, perfluorocycloheptylamine, perfluoropyrrolidine, perfluoropiperidine, perfluoroazacycloheptane, perfluoro-2-dodecylpyrrolidine, perfluoro-2-octylpiperidine, perfluoro-2-ethylazacycloheptane, etc.

The products of the process of the invention are generally useful as fluorochemical intermediates, (e.g. in the preparation of fluorochemical acids, fluorochemical secondary amines, polymers, and other types of materials) and as fluorinated oxidants (for example, for bleaching and the like, for oxidizing agents in chemical synthesis, and, when combined with proper fuels and binders, as oxidizers in propellants and the like). Among the products of the process of the invention include perfluoromethylimine, perfluoroethylimine, perfluorohyxylimine, perfluorooctadecylimine, perfluoro-5-azatetradecene-4, perfluoro-11-aza-nonacosene-10, perfluoro-2-ethylpentylimine, perfluoro-2-nonyldodecylimine, perfluror-2-azaisopentene-2, perfluoro-13-aza-14-methylpentacosene-13, perfluoro-19-aza-20-octadecylheptatriacontene-19, perfluorocyclopentylimine, perfluorocyclohexylimine, perfluorocycloheptylimine, perfluoro-N-methyliminocyclopentane, perfluoro-N-heptyliminocyclohexane, perfluoro-N-dodecyliminocycloheptane, perfluoropyrroline, perfluoro-Δ'-piperideine, perfluoro-Δ'-azacycloheptane, perfluoro-2-decylpyrroline, perfluoro-2-octyl-Δ'-piperideine, perfluoro-2-ethyl-Δ'-azacycloheptene, etc.

In order to more clearly disclose the process of the invention, a number of specific examples will now be given. All parts are by weight unless otherwise designated. For convenience, the reactants and products which appear in the examples are identified by structure in Table I.

TABLE I

| Example No. | R\CF—NFR / R | R\C=NR / R |
|---|---|---|
| 1 | $C_3F_7$\CF—$NF_2$ / F | $C_3F_7$\C=NF / F |
| 2 | $CF_3$\CF—$NFC_2F_5$ / F | $CF_3$\C=$NC_2F_5$ / F |
| 3 | $C_5F_{11}$\CF—$NF_2$ / $CF_3$ | $C_5F_{11}$\C=NF / $CF_3$ |
| 4 | $CF_3$\CF—$NFCF_3$ / $CF_3$ | $CF_3$\C=$NCF_3$ / $CF_3$ |
| 5 | $CF_2$—$CF_2$ / \ $CF_2$    CF—$NF_2$ \ / $CF_2$—$CF_2$ | $CF_2$—$CF_2$ / \ $CF_2$    C=NF \ / $CF_2$—$CF_2$ |
| 6 | $CF_2$—$CF_2$ / \ $CF_2$    CF—$NFCF_3$ \ / $CF_2$—$CF_2$ | $CF_2$—$CF_2$ / \ $CF_2$    C=$NCF_3$ \ / $CF_2$—$CF_2$ |
| 7 | $CF_2$—$CF_2$ / \ $CF_2$    NF \ / $CF_2$—$CF_2$ | $CF_2$—CF / \ $CF_2$    N \ / $CF_2$—$CF_2$ |
| 8 | NF—$CF_2$ / \ $CF_2$    NF \ / NF—$CF_2$ | N—CF / \ CF    N \ / N=CF |
| 9 | $CF_3$—$CF_2$ \ NF / $CF_3$—C—$C_8F_{17}$ \| F | $CF_3$—CF \ N / $CF_3$—C—$C_8F_{17}$ \| F <br>and<br> $CF_3$—$CF_2$ \ N / $CF_3$—C—$C_8F_{17}$ |
| 10 | $CFCl_2$\CF—$NF_2$ / F | $CFCl_2$\C=NF / F |
| 11 | CF—$NF_2$ / $CF_2$ \ $CF_2$—$NF_2$ | CF=NF / CF \ CF=NF |
| 12 | $CF_2$—$CF_2$ / \ O    NF \ / $CF_2$—$CF_2$ | $CF_2$—CF / \ O    N \ / $CF_2$—$CF_2$ |
| 13 | $CF_2$—$CF_2$ / \ $CF_2$    NF \ CF—CF / \ $CF_2$    $CF_2$ \ / $CF_2$—$CF_2$ | $CF_2$—CF / \ $CF_2$    N \ CF—CF / \ $CF_2$    $CF_2$ \ / $CF_2$—$CF_2$ |
| 14 | $CF_2$—$CF_2$ / \ $F_4S$    NF \ / $CF_2$—$CF_2$ | and<br>$CF_2$—$CF_2$ / \ $CF_2$    N \ CF—C \ / $CF_2$    $CF_2$ \ / $CF_2$—$CF_2$ <br><br> $CF_2$—$CF_2$ / \ $F_4S$    N \ / $CF_2$—CF |

EXAMPLE 1

Preparation of perfluoro-n-butylimine.

The precursor perfluoro-n-butylamine is prepared from n-butylamine by the electrochemical process (J. H. Simons, U.S. Pat. No. 2,519,983, 1950). The crude perfluoro-n-butylamine is collected in dry ice cooled traps. After fractional distillation of this crude product a liquid fraction is obtained which is identified as 40 percent perfluoro-n-butylamine as a solution in perfluorobutane. This material is further purified by preparative scale vapor phase chromatography. The purified material has a molecular weight of 270 (as compared to a calculated value of 271) and a boiling point of about 30.5° C. The infrared absorption spectrum and the nuclear magnetic resonance spectrum indicate that this product is perfluoro-n-butylamine.

A dry 5 cc. capacity heavy-walled glass ampoule is charged with 0.371 grams ($1.99 \times 10^{-3}$ mole) of dicyclopentadienyliron and 1.5 ml. of carbon tetrachloride. This mixture is cooled to liquid nitrogen temperature and degassed by reducing the pressure in the ampoule to not more than about 0.1 mm of mercury pressure. A 0.251 gram ($9.25 \times 10^{-4}$ moles) sample of perfluoro-n-butylamine is then introduced into the ampoule by condensation and the ampoule is sealed. The reactants are then allowed to come to room temperature (i.e. approximately 25° C.). The mixture is allowed to stand for 6 days at 25° C. during which time the ampoule is shaken occasionally. At the end of this time the ampoule is cooled to liquid nitrogen temperature and opened. The reaction mixture is subjected to separation by preparative vapor phase chromatographic techniques with the result that the yield of 82.2 percent of theoretical of perfluoro-n-butylimine is recovered. This material boils at 22° C. and contains 20.4 percent of carbon, 72.2 percent of fluorine and 6.0 percent of nitrogen as compared to calculated values of 20.6 percent, 73.4 percent and 6.0 percent, respectively. The molecular weight of this product is found to be 230 as compared to a calculated value of 233. The infrared and nuclear magnetic resonance spectra of this material support the assigned structure.

EXAMPLE 2

Preparation of perfluoro-3-azapentene.

Perfluorodiethylamine is prepared utilizing the electrochemical process of U.S. Pat. No. 2,519,983 (Simons, 1950) from diethylamine. The reaction product of the electrochemical step is fractionally distilled to yield a mixture of the structural isomers perfluorodimethylethylamine and perfluorodiethylamine and the ratio of 4.5 to 1. Perfluorodiethylamine is obtained from this mixture by preparative scale chromatographic separation (94 percent perfluorodiethylamine). The molecular weight of this material is found to be 269 as compared to a calculated value of 271. Its boiling point is 26° C. The infrared and nuclear magnetic resonance spectra are consistent with the assigned structure.

0.93 Grams (5.0 × 10⁻³ moles) of dicyclopentadienyliron and about 2 cc. of a tetramer of trifluorochloroethylene are mixed to form a grease. The inside walls of a 50 ml. heavy-walled glass ampoule (which is fitted with a 24/40 joint and stop cock) are coated with this grease by means of a spatula. The ampoule is then cooled to liquid nitrogen temperature and the contents thereof degassed by reducing the pressure in the ampoule to not more than about 0.1 mm of mercury pressure. 0.678 Grams (2.5 × 10⁻³ moles) of perfluorodiethylamine are then introduced into the ampoule by condensation and the ampoule is sealed by closing the stop cock. The reactants are then allowed to come to room temperature (i.e. approximately 25° C. and are allowed to stand for 2 hours at that temperature. At the end of this time the ampoule is opened and the desired product, perfluoro-3-azapentene, is separated from the reaction mixture by preparative vapor phase chromatographic trapping techniques. A 84.2 percent conversion to this product is obtained. Its boiling point is 14° C. as compared to a value of 13° to 13.5° C. reported in U.S. Pat. No. 2,643,267 (W. H. Pearlson and L. J. Hals, 1953), its molecular weight is found to be 232 as compared to calculated value of 233. The infrared spectrum of this product is identical to that of the perfluoro-3-azapentene obtained by the pyrolysis of perfluorotriethylamine, the process utilized to obtain it in U.S. Pat. No. 2,643,267. The nuclear magnetic resonance spectra is also consistent with the assigned structure.

EXAMPLE 3

Preparation of perfluoro-2-methylhexylimine.

Perfluoro-2-methylhexylamine is prepared utilizing the electrochemical process of Simons, U.S. Pat. No. 2,519,983 (1950) from 2-methylhexylamine. The crude fluorination product is purified by fractional distillation followed by preparative vapor phase chromatography. The molecular weight of the purified product, as well as the infrared and fluorine nuclear magnetic resonance spectra are consistent with the assigned structure.

In a dry 10 cc. heavy walled glass ampoule are placed 0.67 grams (3.6 × 10⁻³ moles) of dicyclopentadienyliron and about 3 cc. of xylene hexafluoride. This mixture is cooled to −196° C., degassed and 0.75 grams (1.78 × 10⁻³ moles) of perfluoro-2-methylhexylamine are then introduced into the ampoule by condensation. After sealing, the ampoule is allowed to stand at room temperature for 12 days after which it is cooled to liquid nitrogen temperature and opened. Fractional distillation condensation of the crude product followed by preparative vapor phase chromatography results in a product of high purity which exhibits the expected infrared and nuclear magnetic resonance spectra for perfluoro-2-methylhexylimine.

EXAMPLE 4

Preparation of perfluoro-2-azaisopentene-2.

The reactant perfluoro-N-isopropylmethylamine is prepared by the electrofluorination of N-isopropylmethylamine using the process described in U.S. Pat. No. 2,519,983 (1950). The purified material has a boiling point in the expected range and infrared and nuclear magnetic resonance spectra consistent with the structure.

A dry-box is employed for the addition of 0.813 grams (3.0 × 10⁻³ moles) of dicumene chromium and 3–4 cc. of xylene hexafluoride to a 10 cc. glass ampoule. After degassing at liquid nitrogen temperature, 0.41 grams (1.46 × 10⁻³ moles) of perfluoro-N-isopropylmethylamine are then introduced to the ampoule by condensation and the ampoule is sealed. The reaction vessel is allowed to warm to and remain at room temperature for a period of 4 hours during which time the vessel is periodically shaken. At the end of that time the vessel is opened and the desired product, perfluoro-2-azaisopentene-2, is separated from the remainder of the reaction mixture by chromatography. The infrared absorption and nuclear magnetic resonance spectra supported the assigned structure.

EXAMPLE 5

Preparation of perfluorocyclohexylimine.

Perfluorocyclohexylamine is obtained by the electrofluorination of cyclohexylamine. The preparation of this material by the electrofluorination of aniline has been described in U.S. Pat. No. 2,490,099, 1949, J. H. Simons. After electrofluorination, the desired product and perfluorocyclohexane prepared in the electrofluorination reaction are partially separated by fractional distillation and pure perfluorocyclohexylamine is obtained from this material by preparative vapor phase chromatographic trapping techniques. This material is found to boil at 76°–78° C. (the boiling point reported in the Simon patent is 77° C.) and the infrared and nuclear magnetic resonance spectra are consistent with the assigned structure.

A dry 10 cc. capacity heavy-walled glass-ampoule is charged with 1.49 grams (8.0 × 10⁻³ moles) of dicyclopentadienyl iron and 5 ml. of trichlorofluoromethane. This mixture is cooled to liquid nitrogen temperature and degassed by reducing the pressure in the ampoule to not more than about 0.1 mm of mercury pressure. 1.33 Grams (4.0 × 10⁻³ moles) of perfluorocyclohexylamine are then introduced into the ampoule by condensation and the ampoule is sealed. The reactants are allowed to come to room temperature (i.e. approximately 25° C.). The mixture is allowed to stand for 7 days at 25° C. during which time the ampoule is shaken occasionally. At the end of this time the ampoule is cooled to liquid nitrogen temperature and opened. A crude separation of the desired product from the remainder of the reaction mixture is accomplished by fractional distillation-condensation techniques and a relatively pure material is then obtained utilizing chromatography. This material is found to contain 24.3 percent of carbon, 69.8 percent of fluorine and 4.6 percent of nitrogen as compared to calculated values of 24.4 percent, 70.8 percent and 4.7 percent, respectively. The infrared absorption and nuclear magnetic resonance spectra are consistent with the assigned structure.

EXAMPLE 6

Preparation of perfluoro-N-methyliminocycloheptane.

The electrochemical process described by Simons, U.S. Pat. No. 2,519,983 (1950) is employed in the preparation of perfluoro-N-methylcycloheptylamine from N-methylcycloheptylamine. The desired product is isolated from the reaction mixture by fractional distillation under reduced pressure and the purified product is obtained from that distillate by vapor phase chromatography. Infrared and nuclear magnetic resonance spectra are consistent with the assigned structure.

0.664 Grams (4.0 × 10⁻³ moles) of potassium iodide dissolved in a 97 percent acetonitrile −3 percent water mixture (0.25 × 10⁻³ moles of potassium iodide per milliliter) is placed in a 50 cc. glass ampoule and cooled to −196° C. 0.866 Grams (2.0 × 10⁻³ moles) of perfluoro-N-methylcycloheptylamine is then added as a liquid to the cooled reactor. After sealing the reactor, the mixture is allowed to warm to room temperature and react with shaking for a period of 3 hours. Initial separation by fractional distillation-condensation techniques, followed by vapor phase chromatography, is utilized to obtain pure perfluoro-N-methyliminocycloheptane. The identity of the product is confirmed by infrared and nuclear magnetic resonance spectroscopy.

EXAMPLE 7

Preparation of perfluro-Δ'-piperideine.

The reactant perfluoropiperidine is prepared by the electrofluorination of pyridine as reported by Simmons and Hoffmann in the Journal of the American Chemical Society, 79, 3429, (1957). The purified material obtained has a boiling point of 48.7°–49° C. (compared to a reported value of 49.5° C.) and has a molecular weight of 283, the same as the theoretical value. The nuclear magnetic resonance and infrared spectra are consistent with the assigned structure.

1.49 Grams (8.0 × 10$^{-3}$ moles) of dicyclopentadienyliron and about 1 gram of a tetramer of trifluorochloroethylene are mixed to form a paste. The inside walls of a 55 ml. capacity heavy-walled glass flask fitted with a 24/40 joint and stop cock are coated by applying the paste with a spatula. The flask is cooled to liquid nitrogen temperature and the contents thereof degassed by reducing the pressure in the flask to not more than about 0.1 mm. of mercury. 1.0 Gram (3.54 × 10$^{-3}$ moles) of perfluoropiperidine are then introduced into the ampoule by condensation and the ampoule is sealed. The flask is allowed to come to room temperature (approximately 25° C.) and is allowed to stand for 2 hours at approximately 25° C. At the end of that time the flask is opened and the desired product, perfluoro-Δ'-piperideine, is separated from the remainder of the volatile reaction mixture by chromatography. The purified product is found to contain 24.1 percent of carbon, 69.0 percent of fluorine and 5.5 percent of nitrogen as compared to calculated values of 24.5 percent, 69.8 percent and 5.7 percent, respectively. This material has a molecular weight of 241 (calculated value 245) and a boiling point of 43° C. (Lit. b.p. 43° C., H. Ulrick, E. Kober, H. Schroeder, R. Ratz and C. Grundmann, J. Org. Chem., 27, 2585 (1962)). A conversion of approximately 94 percent is realized (as measured by vapor phase chromatography peak areas). The infrared absorption and nuclear magnetic resonance spectra support the assigned structure.

EXAMPLE 8

Preparation of cyanuric fluoride.

The direct fluorination of cyanuric fluoride according to the process of J. B. Hynes and L. A. Bigelow, J. Am. Chem. Soc. 84, 2751 (1962) is utilized to prepare perfluorohexahydro-s-triazine. The crude product mixture is concentrated by simple distillation and the pure perfluorohexahydro-s-triazine is obtained by vapor phase chromatography. Infrared, mass and nuclear magnetic resonance spectra confirm the assigned structure of the purified material boiling at 48° C. (Lit. above b.p. 51° C.).

0.223 Grams (1.2 × 10$^{-3}$ moles) of dicyclopentadienyliron and 0.5 gram of a tetramer of trifluorochloroethylene are mixed to form a paste. The inside walls of a 10 ml. capacity heavy-walled glass flask fitted with a 24/40 joint and stopcock are coated with this paste by means of a spatula. The flask and its contents are cooled to liquid nitrogen temperature and degassed by reducing the pressure in the flask to not more than about 0.1 mm. of mercury. 0.050 Grams (2.01 × 10$^{-4}$ mole) of perfluorohexahydro-s-triazine are then introduced into the flask by condensation and the flask is sealed by closing the stopcock. The reactants are then allowed to come to room temperature (approximately 25° C.). After standing for 18 hours at room temperature, the flask is cooled to liquid nitrogen temperature and opened. The volatile products of the reaction are separated by vapor phase chromatography. A conversion to cyanuric fluoride of 96.5 percent is realized. The infrared spectrum of this material is compared to the spectrum of a known sample of cyanuric fluoride thus confirming the identity of the product.

EXAMPLE 9

Preparation of perfluoro-2-octylpyrroline and perfluoro-5-octylpyrroline.

The electrochemical process described by Simons, U.S. Pat. No. 2,519,983 (1950) is utilized to prepare perfluoro-2-octylpyrrolidine from 2-octylpyrrolidine. A reasonably pure product is isolated from the liquid reaction mixture by vapor phase chromatography using a heated column. Infrared and nuclear magnetic resonance spectra confirm the structure as perfluoro-2-octylpyrrolidine.

0.633 Grams (1.0 × 10$^{-3}$ moles) of perfluoro-2-octylpyrrolidine is condensed into a previously degassed 10 ml. glass ampoule which contains 0.585 grams (2.0 × 10$^{-3}$ moles) of dicumene chromium and 3 milliliters of xylene hexafluoride at liquid nitrogen temperature. The reactor is sealed and allowed to warm to and remain at room temperature for 4 days with periodic shaking. Separation of the reaction mixture is accomplished by vapor phase chromatography utilizing a column at a temperature greater than 100° C. The infrared and nuclear magnetic resonance spectra are consistent for the $C_{12}F_{23}N$ isomers of perfluorooctylpyrroline.

EXAMPLE 10

Preparation of 2,2-dichlorotrifluorethylimine.

The starting material, 3,3-dichloropentafluoro-1-azapropane (b.p. 44° C.) is prepared by the jet fluorination of dichloromalononitrile according to the method of L. A. Bigelow (L. A. Bigelow, J. B. Hynes and B. C. Bishop, Second International Symposium on Fluorine Chemistry, Estes Park, Col., July 17–20, 1962).

The 3,3-dichloropentafluoro-1-azapropane (0.204 g., 1 × 10$^{-3}$ moles) is condensed into a 10 ml. ampoule which contains dicyclopentadienyliron (0.558 g., 3 × 10$^{-3}$ moles) and 7 ml. of xylene hepafluoride and is held at liquid nitrogen temperature. After the ampoule is sealed, the reactants warm to and remain at room temperature for a period of 14 days. At the end of this time, the ampoule is opened and its contents are separated by fractional distillation-condensation techniques utilizing traps at −35° and −196° C. The −196° C. fraction is further purified by vapor phase chromatography and yields 34 percent of the theoretical amount of pure 2,2-dichlorotrifluoroethylimine. This material is found to contain 14.5 percent of carbon and 34.2 percent of fluorine as compared to calculated values of 14.5 percent and 34.3 percent, respectively. The molecular weight of the purified material is 168 as compared to a theoretical value of 166. The infrared and nuclear magnetic resonance spectra are consistent with the assigned structure.

EXAMPLE 11

Preparation of perfluoro-1,5-diaza-1,4-pentadiene.

The reactant for this example, perfluoro-1,5-diazapentane is prepared from difluoromalononitrile by the jet fluorination process (L. A. Bigelow, J. B. Hynes and B. C. Bishop, Second International Symposium on Fluorine Chemistry, Estes Park, Col., July 17–20, 1962). The purified material has a boiling point of 33° C.

A dry 20 cc. glass ampoule is charged with 0.744 g. (4 × 10$^{-3}$ moles) of dicyclopentadienyliron and 10 cc. of xylene hexafluoride. This mixture is cooled to −196° C. and degassed by reducing the pressure in the ampoule to not more than about 0.1 mm. of mercury pressure. A 0.254 g. (1 × 10$^{-3}$ moles) sample of perfluoro-1,5-diazapentane is then introduced into the ampoule by condensation and the ampoule is sealed. The reactants are allowed to come to room temperature. The mixture is allowed to stand with periodic shaking for 13 days. At the end of this time the contents are separated by fractionation through −78° and −196° C. traps. The contents of the −196° C. receiver are further purified by vapor phase chromatography. The purified product is obtained in a 30.5 percent yield and identified as perfluoro-1,5-diaza-1,4-pentadiene. This material contains 19.9 percent of carbon, 62.9 percent of fluorine and has a molecular weight of 181 as compared to calculated values of 20.2 percent, 64.0 percent and 178, respectively. The infrared and nuclear magnetic resonance spectra also support the structure.

EXAMPLE 12

Preparation of perfluoro-5,6-dihydro-2H-1,4-oxazine.

Perfluoromorpholine, the reactant, is prepared by the electrochemical fluorination of morpholine as described in the literature (T. C. Simmons and F. W. Hoffmann, J. Am. Chem. Soc., 79, 3429 (1957)). The purified material exhibits the expected infrared and nuclear magnetic resonance spectra and a boiling point of 30° C.

To 0.931 grams (5 × 10⁻³ moles) of dicyclopentadienyliron is added sufficient trifluorochlorethylene tetramer oil to result in a paste and this is applied to the walls of a 50 cc. ampoule by means of a spatula. The ampoule is degassed and cooled to −196° C. and 0.454 g. (1.84 × 10⁻³ moles) of perfluoromorpholine is added by condensation techniques. The mixture is allowed to warm to and remain at room temperature for 45 minutes. The volatile reaction mixture is then removed from the ampoule and purified by vapor phase chromatography. There is obtained a 42 percent yield of perfluoro-5,6-dihydro-2H-1,4-oxazine which exhibits the expected infrared and nuclear magnetic resonance spectra. This material has a molecular weight of 213 and contains 22.5 percent carbon and 63.7 percent fluorine as compared to calculated values of 211, 22.8 percent and 63.0 percent, respectively.

EXAMPLE 13

Preparation of perfluoro-3,4,5,6,7,8,9,10-octahydroquinoline and perfluoro-2,3,4,5,6,7,8,10-octahydroquinoline.

Perfluoroquinoline, the starting material for this example, is prepared according to Haszeldine (R. N. Haszeldine and F. Smith, J. Chem. Soc. (1956) 783). The pure heterocyclic fluorocarbon, boiling at 130° C., is obtained in low yield by passing quinoline over cobalt trifluoride at 400° C. and distillation of the reaction mixture.

Perfluoroquinoline (0.52 grams, 1.17 × 10⁻³ moles) is added to a 20 cc. ampoule which contains 0.745 grams (4.0 × 10⁻³ moles) of dicyclopentadienyliron dissolved in 10 cc. of dichlorodifluoromethane cooled to liquid nitrogen temperature. The ampoule is sealed, allowed to warm to room temperature and remain there with periodic shaking over a period of 2 weeks. Fractionation of the reaction mixture through −78° and −196° C. receivers separates the product from the solvent. The contents of the −78° C. trap are purified by vapor phase chromatography utilizing a heated column of trifluorochloroethylene grease on a diatomaceous earth support. The pure product of empirical formula $C_9F_{15}N$ is identified as being a mixture of perfluoro-3,4,5,6,7,8,9,10-octahydroquinoline and perfluoro-2,3,4,5,6,7,8,10-octahydroquinoline by infrared and nuclear magnetic resonance spectroscopy.

EXAMPLE 14

Preparation of 1,1,1,1-tetrafluoroperfluoro-5,6-dihydro-2H-1,4-thiazine.

The electrofluorination of tetrahydro-1,4-thiazine (W. Davies, J. Chem. Soc. (1920) 117, 297) to 1,1,1,1-tetrafluoro-4-fluoroperfluorotetrahydro-1,4-thiazine is carried out as generally described by Simons (U.S. Pat. No. 2,519,983, 1950). The pure material is separated from the fluorocarbon cleavage products by distillation and preparative vapor phase chromatography. The structure of 1,1,1,1-tetrafluoro-4-fluoroperfluorotetrahydro-1,4-thiazine is confirmed by infrared and nuclear magnetic resonance spectral analyses.

1,1,1,1-Tetrafluoro-4-fluoroperfluorotetrahydro-1,4-thiazine (0.341 g., 1 × 10⁻³ moles) is condensed into a 20 ml. ampoule cooled to −196 containing a magnetic stirring bar, dicyclopentadienyliron (0.372 g., 2 × 10⁻³ moles) and 8 ml. of dichloromethane. The ampoule is sealed under vacuum and allowed to warm to and remain at room temperature with stirring for 2 weeks.

After opening the ampoule, the volatile contents are distilled from the solid residue of ferricinium fluoride. Final purification by vapor phase chromatography on a trifluorochloroethylene grease column at 50° C. affords pure 1,1,1,1-tetrafluoroperfluoro-5,6-dihydro-2H-1,4-thiazine.

The infrared and nuclear magnetic resonance spectra are consistent with the proposed structure.

What is claimed is:

1. A process for the preparation of a compound of the formula:

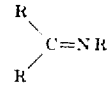

wherein each R is selected from the class consisting of fluorine, perfluorinated groups and perfluorinated groups substituted by electronegative groups having Hammett meta sigma parameters of at least +0.3 and wherein R groups taken together can form rings through the atoms to which they are bonded, which comprises reductively defluorinating a compound of the formula:

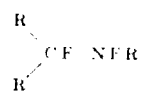

wherein the R groups are as previously defined, and isolating the desired product.

2. A process according to claim 1 wherein two of the R groups are fluorine and the third contains only carbon and fluorine.

3. A process according to claim 1 wherein the desired product contains chlorine.

4. A process according to claim 1 wherein at least one of the R groups contains nitrogen.

5. A process according to claim 1 wherein the R groups are fluoroalkyl and contain only carbon and fluorine.

6. A process according to claim 1 wherein the two R groups on the carbon atom form a ring.

7. A process according to claim 1 wherein the R group on the nitrogen atom forms a ring system with one of the other R groups.

8. A compound of the formula:

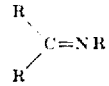

wherein each R is selected from the class consisting of fluorine and fluoroalkyl radicals and wherein R groups taken together can form ring systems, which compound comprises a ring which contains a plurality of hetero atoms therein, said ring containing only a single azomethine group, provided that said compound contains no atoms other than carbon, fluorine, nitrogen, oxygen and sulfur atoms.

9. A compound according to claim 8 which contains only carbon, fluorine, nitrogen and oxygen atoms.

10. Perfluoro-5,6-dihydro-2H-1,4-oxazine.

11. A compound according to claim 8 which contains only carbon, fluorine, nitrogen and sulfur atoms.

12. 1,1,1,1-tetrafluoroperfluoro-5,6-dihydro-2H-1,4-thiazine.

* * * * *